(12) United States Patent
Foyle

(10) Patent No.: US 9,012,871 B2
(45) Date of Patent: Apr. 21, 2015

(54) USE OF FLUORESCENT INKS FOR DOCUMENT AUTHENTICATION

(71) Applicant: Delphax Technologies Inc., Bloomington, MN (US)

(72) Inventor: Victor Foyle, Toronto (CA)

(73) Assignee: Delphax Technologies Inc., Bloomington, MN (US)

( * ) Notice: Subject to any disclaimer, the term of this patent is extended or adjusted under 35 U.S.C. 154(b) by 0 days.

(21) Appl. No.: 14/267,815

(22) Filed: May 1, 2014

(65) Prior Publication Data

US 2014/0326864 A1    Nov. 6, 2014

Related U.S. Application Data

(60) Provisional application No. 61/818,813, filed on May 2, 2013.

(51) Int. Cl.

| | |
|---|---|
| *B41M 3/14* | (2006.01) |
| *B42D 15/00* | (2006.01) |
| *B42D 25/387* | (2014.01) |
| *B42D 25/378* | (2014.01) |
| *G07D 7/12* | (2006.01) |
| *D21H 21/40* | (2006.01) |

(52) U.S. Cl.
CPC ........... *B41M 3/144* (2013.01); *B42D 15/0013* (2013.01); *B42D 2031/04* (2013.01); *B42D 2033/20* (2013.01); *B42D 2035/40* (2013.01); *B42D 25/387* (2014.10); *B42D 25/378* (2014.10); *G07D 7/122* (2013.01); *D21H 21/40* (2013.01)

(58) Field of Classification Search
CPC ........ C09K 11/06; B41M 3/14; B41M 3/144; B42D 15/0013; B42D 25/378; B42D 25/387; G07D 7/122
USPC ......................................................... 250/271
See application file for complete search history.

(56) References Cited

U.S. PATENT DOCUMENTS

| | | | |
|---|---|---|---|
| 3,886,083 | A | 5/1975 | Laxer |
| 5,866,638 | A | 2/1999 | Shimomura et al. |
| 6,400,386 | B1 | 6/2002 | No |
| 7,517,073 | B2 | 4/2009 | Nito et al. |
| 7,722,179 | B2 | 5/2010 | Mubarekyan et al. |
| 7,897,653 | B2 * | 3/2011 | Iftime et al. .................... 522/75 |

(Continued)

FOREIGN PATENT DOCUMENTS

| | | |
|---|---|---|
| CA | 2678341 A1 | 3/2010 |
| EP | 1179807 A1 | 2/2002 |
| EP | 2399962 A1 | 12/2011 |

*Primary Examiner* — Marcus Taningco
(74) *Attorney, Agent, or Firm* — Stuart L. Wilkinson

(57) ABSTRACT

In a method for introducing an authentication print characteristic in a visible image printed on paper, a part of the image is printed with an ink having first and second component dyes. The first component is less fast than the second component in response to an applied activator. The first component is normally masked by the second component but applying an activator stimulates a bleed of the first component beyond the area of the image part to create a predetermined unmasked area of the fluorescent component. The invention extends to paper on which the authentication print characteristic has been printed and to a method of detecting a forged image by analyzing paper to detect such an image bleed.

28 Claims, 5 Drawing Sheets

(56) References Cited

U.S. PATENT DOCUMENTS 7,951,233 B2  5/2011  Tsao
2004/0254074 A1*  12/2004  Awano et al. ............ 503/227
2008/0087190 A1*  4/2008  Iftime et al. ............ 106/31.15
2014/0001377 A1*  1/2014  Iftime et al. ............ 250/461.1

* cited by examiner

US 9,012,871 B2

USE OF FLUORESCENT INKS FOR DOCUMENT AUTHENTICATION

CROSS REFERENCE TO RELATED PATENTS

The present U.S. Utility patent application claims priority pursuant to 35 U.S.C. §119(e) from U.S. Provisional Patent Application Ser. No. 61/642,299, entitled "USE OF FLOURESCENT INKS FOR DOCUMENT AUTHENTICATION", filed May 2, 2013.

FIELD OF THE INVENTION

This invention relates to the use of fluorescent inks for document authentication.

DESCRIPTION OF RELATED ART

The use of fluorescent inks for document authentication is known. Usually, this takes the form of selectively printing an area of a document with a pattern of the fluorescent ink which may not be visible to the unaided eye on a casual viewing of the document but which appears as a fluorescent image when the document is viewed by ultraviolet or so-called black light. A document which has not been printed with the pattern of fluorescent ink will not fluoresce when illuminated with black light and therefore may be shown to be a fraudulent copy of the original document.

BRIEF DESCRIPTION OF THE DRAWINGS

For simplicity and clarity of illustration, elements illustrated in the following figures are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

In inkjet printers, it is common to construct an image using a number of differently colored inks which are delivered to the nozzles of the inkjet print head. The primary colors for a subtractive system, such as printing, are cyan, magenta, and yellow. Subtracting all the primaries gives white, while adding them all together gives black.

Figure 1:
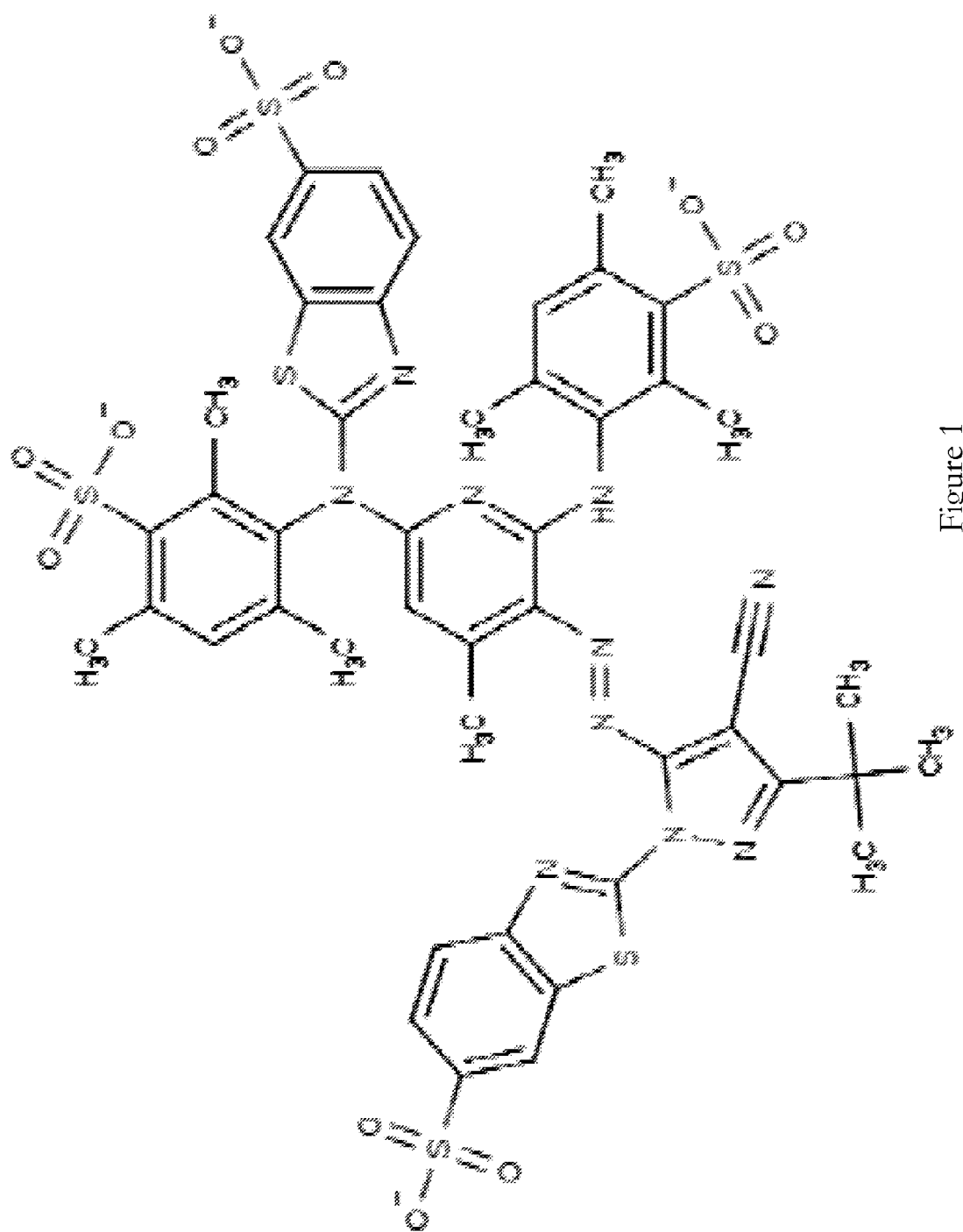
FIG. 1 shows the structure of a major component dye for use in a method and printed paper according to an embodiment of the invention.
Figure 2:
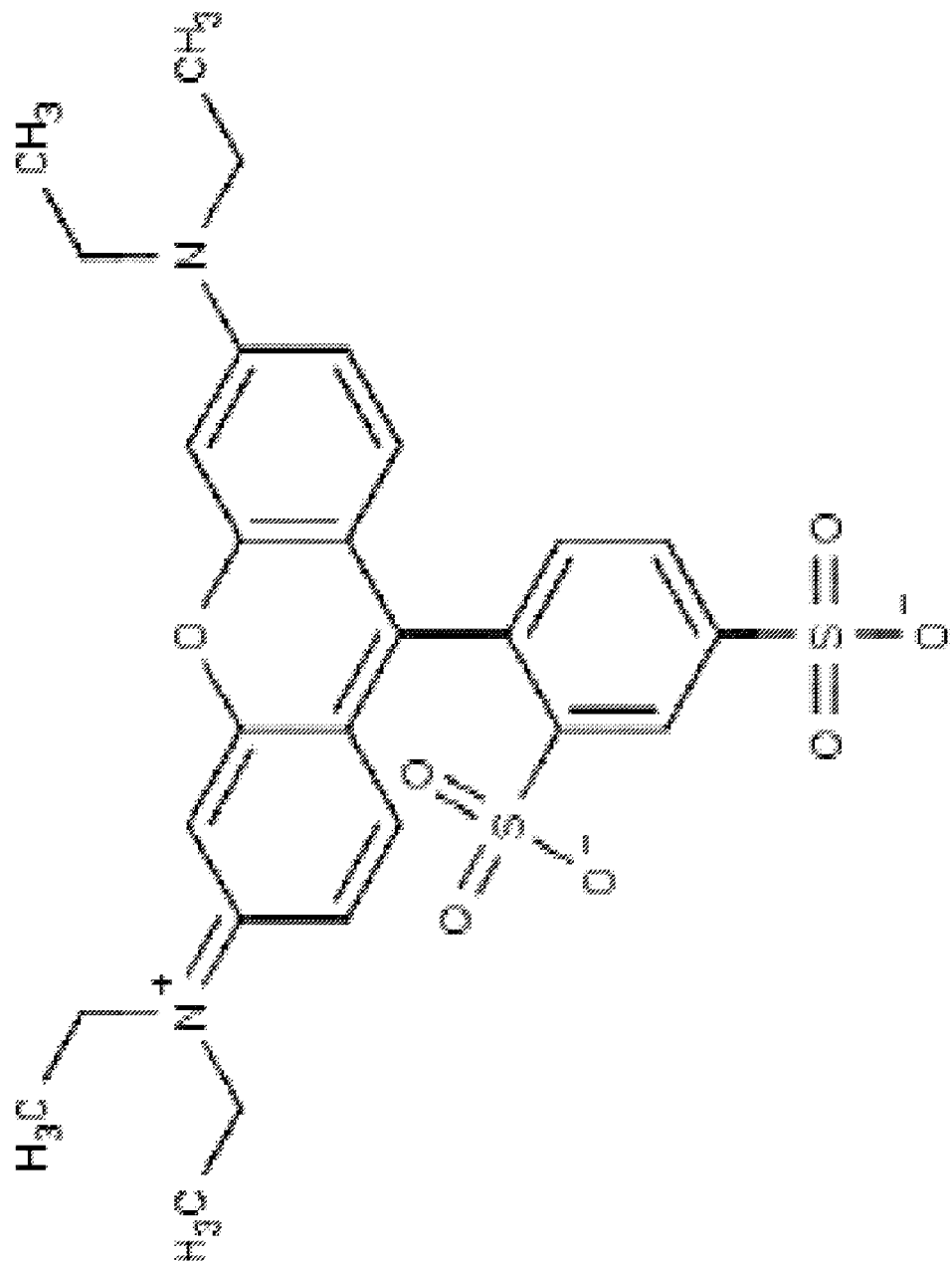
FIG. 2 shows the structure of a minor component dye for use in a method and printed paper according to an embodiment of the invention.

A printing ink of particular interest is a magenta ink available from Memjet, 10920 Via Frontera, Suite 120, San Diego, Calif. 92127 under the tradename, Guthega CR5 magenta ink. This ink is a mixture of two dyes: an azo pyridine class dye (major component) and acid red 52, a fluorescent sulforhodamine B dye (minor component). The azo pyridine dye is dipotassium disodium 2-{3-tert-butyl-4-cyano-5-[(E)-2-{4-methyl-6-[(6-sulfonato-1,3-benzothiazol-2-yl)(2,4,6-trimethyl-3-sulfonatophenyl)amino]-2-[(2,4,6-trimethyl-3-sulfonatophenyl)amino]pyridin-3-yl}diazen-1-yl]-1H-pyrazol-1-yl}-1,3-benzothiazole-6-sulfonate. Its structure is illustrated in FIG. 1. Acid red 52 is sodium 4-[6-(diethylamino)-3-(diethyliminiumyl)-3H-xanthen-9-yl]benzene-1,3-disulfonate. Acid red 52 has a chemical formula $C_{27}H_{29}N_2NaO_7S_2$. The ink also goes under a number of alternative names including Acid Leather Red KB, Acid Rhodamine B, Amacid Rhodamine B, Amido Rhodamine B, Brilliant Acid Rhodamine 2B, Food Red 106, Pontacyl Brilliant Pink; acid red 52, CI4 5100; Sulforhodamine B, Xylene Red and is designated with dye registration numbers CI45100 or CAS3520-42-1 by applicable standards bodies. Its structure is shown in FIG. 2.

In an exemplary embodiment of the invention, a primer is applied to paper just before printing an image using inks which include the magenta ink. The primer acts strongly to bind the azo pyridine major component in the magenta ink, but only loosely binds the acid red 52 minor component. As a result, if the paper surface is still moist, the acid red component migrates somewhat over the paper surface, whereas the azo pyridine major component dye does not. The acid red is less fast than the azo pyridine major component. The acid red 52 bleed shows a bright orange-pink fluorescence under black light illumination. In contrast, the magenta ink, if printed on dry paper, whether or not treated with primer, yields substantially no fluorescence because the azo pyridine dye component absorbs incoming ultraviolet and visible light so as to screen the acid red 52 component.

Figure 3:
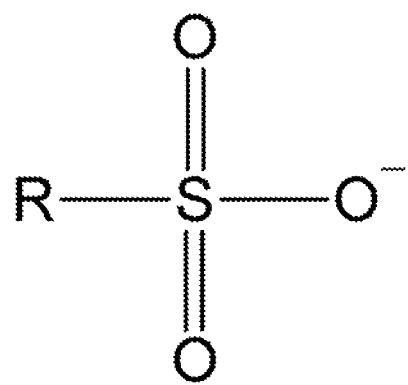
FIG. 3 shows the structure of a sulfonate anion contained in the structures of FIGS. 1 and 2.

The difference in binding of the azo pyridine dye component and the acid red dye component arises, at least in part, from the difference in number of sulfonate anions in the respective molecules. A typical sulfonate anion has a structure as shown in FIG. 3 and binds strongly to cationic components of a primer. As shown in FIG. 1, the azo pyridine dye molecule has 4 sulfonate ions which cause the molecule to bind strongly to the primer. In contrast, as shown in FIG. 2, the acid red molecule has only 2 sulfonate ions which means that the molecule tends to bind less strongly than the 4 sulfonate azo pyridine dye to the primer. Furthermore, the acid red molecule retains a positive charge which is delocalized through the rhodamine structure and which offsets the charge on one of the sulfonate groups, a so-called "inner salt". This cationic structure will repel the polycationic polyDADMAC and weaken the dye binding to it. Alternatively, it can be viewed as canceling one of the sufonate charges, meaning that the dye has only one net anionic group to bind to the polymer.

An exemplary primer for use in this embodiment of the invention comprises, by weight, glycerol (25%), polyethylene glycol [200 molecular weight] 22%), polyDADMAC [of very low molecular weight <100,000] 3%), non-ionic surfactant [such as surfynol 485®] 0.75%) and water (49.25%). PolyDADMAC $(C_8H_{16}NCl)_n$ is poly(diallyldimethylammonium chloride), a homopolymer of diallyldimethylammonium chloride (DADMAC). PolyDADMAC is a high charge density, cationic polymer, the charge density making the material well suited for flocculation, for filler retention, and for controlling otherwise disruptive substances used in papermaking.

The water and the polyDADMAC are important components of the primer in relation to the nature of the present invention. The polyDADMAC acts as a regulator to differentially bind major and minor components of the magenta ink to paper, while the water acts as an activator to cause the bleed of the acid red minor component. Without the polyDADMAC binder, both dyes would bleed and there would not be the same fluorescent effect. With a small amount of water for a short time, the polyDADMAC allows the bleed of the less fast fluorescent dye to occur without the bleed being masked by the major dye. Of note, only a very small amount of the fluorescent dye need be used to obtain the fluorescent bleed. As a corollary, the use of a very small amount of the fluorescent dye means that the paper, where it is subjected to the bleed, will undergo only a faint change of color.

The magenta ink is one example of an ink consisting of or including a combination of dyes in which a major dye binds strongly to a primer and masks a minor dye which binds less strongly to the primer, which is fluorescent, and which bleeds in the presence of a solvent such as water. Such inks will be referred to as fluorescent combination inks in this specification. Other examples of fluorescent inks for use in fluorescent combination inks are listed in Table 1. Each of the listed dyes is water soluble and can be expected not to bind strongly with a cationic primer component such as polyDADMAC.

TABLE 1

| Dye Type and Common Name | Colour Index Generic Name | CAS No. |
|---|---|---|
| Xanthenes | | |
| sodium fluorescein | Acid Yellow 73 | 518-47-8 |
| eosin | Acid Red 87 | 17372-87-1 |
| Rhodamines | | |
| Rhodamine B | Basic Violet 10 | 81-88-9 |
| Rhodamine WT | Acid Red 388 | 37299-86-8 |
| Sulpho Rhodamine G | Acid Red 50 | 5873-16-5 |
| Sulpho Rhodamine B | Acid Red 52 | 3520-42-1 |

Figure 4:
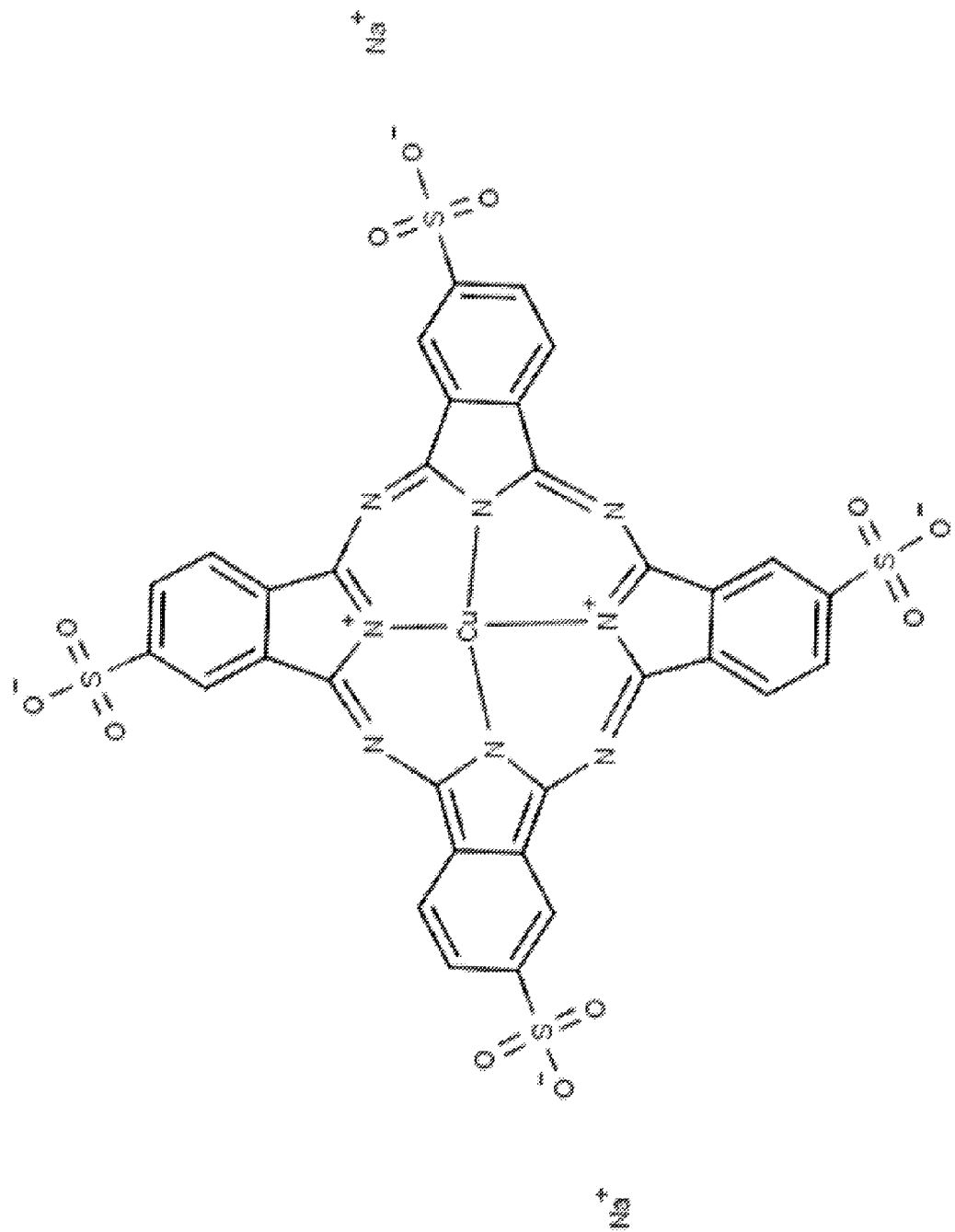
FIG. 4 shows the structure of an alternative major component dye for use in a method and printed paper according to an embodiment of the invention.
Figure 5:
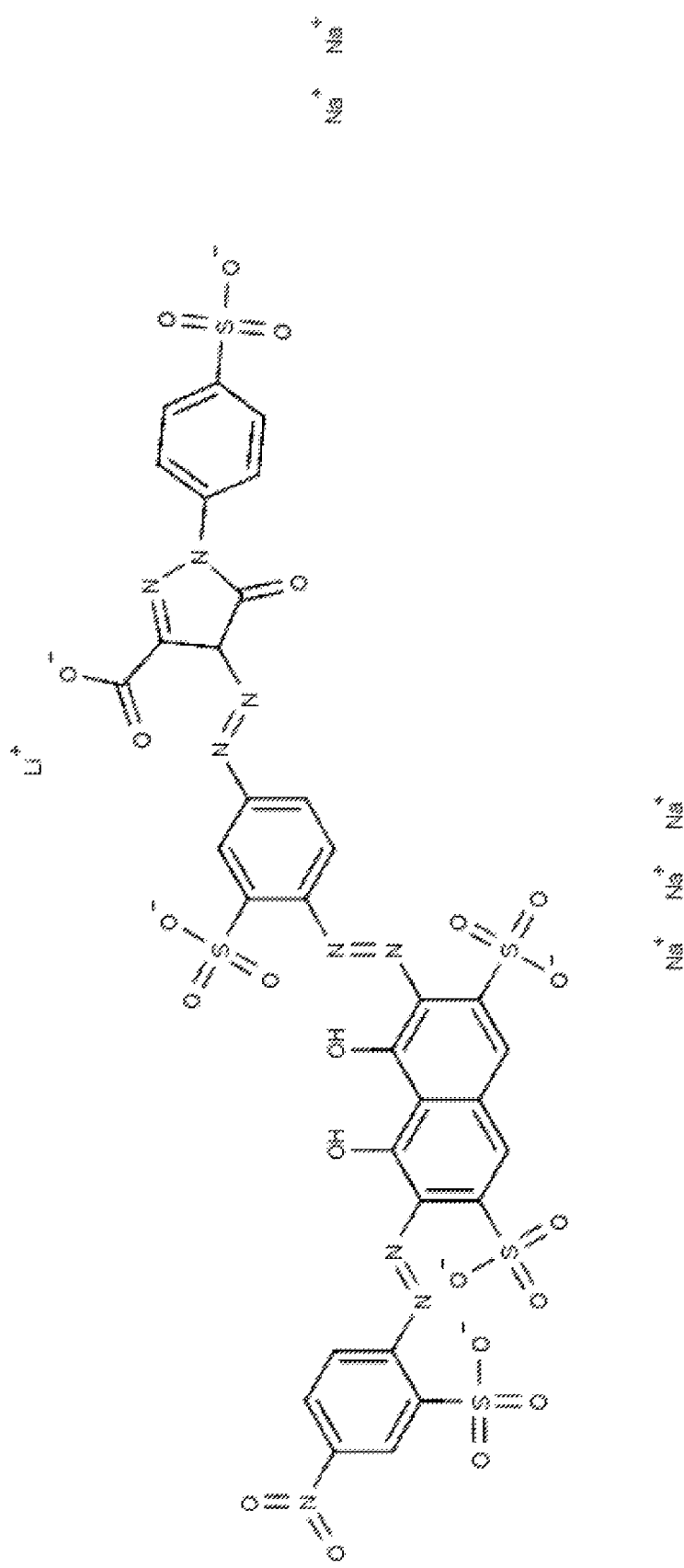
FIG. 5 shows the structure of yet another alternative major component dye for use in a method and printed paper according to an embodiment of the invention.

For use in fluorescent combination inks, other major component dyes that react and bind strongly to polyDADMAC-based primer and which are insoluble in water include:
  cyan, (tetrasodium copper phthlalocyanine tetrasulfonate), having the structure shown in FIG. 4,
  yellow, (double azo class dye, direct yellow 86, formula C39H30N10Na4O13S4, CAS No. 50925-42-3), and
  black, (lithium(1+) ion pentasodium 4-[(E)-2-{4-[(E)-2-{1,8-dihydroxy-7-[(E)-2-(4-nitro-2-sulfonatophenyl)diazen-1-yl]-3,6-disulfonatonaphthalen-2-yl}diazen-1-yl]-3-sulfonatophenyl}diazen-1-yl]-5-oxo-1-(4-sulfonatophenyl)-4,5-dihydro-1H-pyrazole-3-carboxylate), having the structure shown in FIG. 5.

In selecting the components for a fluorescent combination ink, the fluorescent dye should be reasonably close in color to the main dye. Suitable but not exclusive combinations of the above-mentioned major and minor components are:
  sodium fluorescein (minor) and yellow (major)
  rhodamine B (minor) and cyan (major)
  range of minor components (minor) and black (major)

For yellow, which is a light color, a yellow fluorescent dye is preferred. For cyan, a blue fluorescent dye is preferred, but a violet green or even yellow minor component can be contemplated. For black, there is no concern about a change in hue of the ink, so any minor component color dye can be used. The characteristics of fluorescent emission are such that only a small amount of a fluorescent dye is required to produce intense light emission In the following embodiments of the invention, the fluorescence effect described above is used as an authentication feature in a printed image, the presence of the fluorescence confirming the genuineness of the printed image. In this respect, while an intending forger may be able to reproduce the same fluorescent combination ink color, it is unlikely, without a great deal of careful analysis, that the intending forger will be able to detect and exactly emulate the fluorescent "shadow". Even if the fluorescence is detected by the would-be forger, it is unlikely that the exact combination of the two component ink, the primer and the unique and detectable visual effects arising from that combination, can be emulated without a great deal of careful and expensive visual and chemical analysis.

In one embodiment of the invention, paper is roll-coated with primer and, while the primer is still moist or after dampening the primer if previously dried, an image is printed so as to have some fluorescent combination ink areas, but without however taking any steps to impose an authentication pattern. The fluorescent areas obtained in this embodiment of the invention are naturally located by the presence of the fluorescent combination ink areas of the image. The fluorescent effect produced by a bleed of the fluorescent dye component from an area of an image printed using a fluorescent combination ink generally does not show patterning when printing with a dot density of 1600 dots per inch or more, for example, because the dots are so fine that the eye cannot pick out specific fluorescent and non-fluorescent parts. The impression is more of a certain intensity of light emission, the intensity being proportional to the amount of the fluorescent combination ink in the image area. One or more different fluorescent combination inks are used, thereby presenting a unique fluorescence pattern depending on the nature of the inks used and the nature of the image. The fluorescent inks used can be changed from area to area of a page or from page to page providing a further signature character to the fluorescent bleed.

Visible fluorescing activity stimulated within the fluorescent combination ink depends on both a differential binding effect of the primer on the major and minor dye components and the solvent effect of water and other solvents on the minor fluorescent component of the fluorescent combination ink. The water or solvent component causes the fluorescent component to bleed from the applied dye pattern. In contrast, the polyDADMAC component of the primer clamps or binds the dye forming the major component of the two-component ink. If the primer is totally dry, then there is very little bleed of the fluorescent minor component from an image printed on a primed sheet medium. The polyDADMAC therefore acts in some respects like a regulator or controlling agent. Other primer recipes can be adopted to effect the differential binding of the fluorescent combination ink components provided the primer includes a cationic component that binds anionic dyes. The dynamic provided by the water, as activator, and the primer, as binder, can be used to produce unique characteristics in the fluorescent bleed.

Tuning of the fluorescence characteristics is achieved by altering the ratios of the activator and the regulator and by selecting conditions to effect predetermined reaction dynamics in the priming and printing steps. Further differentiating effects are obtained by altering the proportion of the minority component dye to the majority component dye. In particular, it is preferred that the minority component dye be kept at a level where fluorescence in the two-component ink cannot be observed by the unaided eye. Such ratio selection and/or reaction dynamics selection are for example used to set a bleed shadow of a certain width. Alternatively or in addition, a plurality of differently colored fluorescent minor components can used with relative amounts of the fluorescent dyes and/or reaction dynamics selected to set a desired fluorescent color shade. The extent of the bleed can also be tailored to offer further tuning of the fluorescence effect. Thus for example, if the ink is printed after printing of a primer containing water activator, the extent of the bleed is different when compared with the extent of bleed when the image is printed first and then water is jetted onto the image. This difference depends on the amount of water used and on the time that the image is wetted. Each of these operating parameters can be specifically controlled to exercise control over the bleed extent.

In a further authentication application, paper is roll-coated with a primer which is allowed to dry. An image is then printed using several inks at least one of which is a fluorescent combination ink and at least one of which is water to stimulate a bleed from the fluorescent combination ink.

In a further authentication application, a fluorescent combination ink component is inserted in a half tone image having a reasonably high ink coverage area by arranging a cluster of fluorescent combination ink half tone dots where, under normal illumination, the pattern is lost in the surrounding multi-color halftone, but which is revealed under black light against a uniform black background.

In another embodiment of the invention, primer is applied after a two component fluorescent combination ink has been printed onto untreated paper and allowed to dry. The dyes of the fluorescent combination ink, to the extent they spread at all in the paper, do not undergo any differential spreading as the ink dries. Jettable primer is then used to write symbols, code words, or "watermark" type images on the fluorescent combination ink half-tone pattern. Moisture in the subsequently applied primer acts to promote a localized bleed of the minor fluorescent component, while the primer itself acts to bind the major component dye. The fluorescence regions, which will have characteristics determined by the changed order of application of the ink and the primer and of the ink absorption properties of the paper, are similarly rendered visible by the use of black light.

In another authentication application, paper is roll-coated with primer, and while still partially wet or after dampening the primer if previously dried, an authentication pattern is printed on the document in the selected fluorescent combination ink(s). This can for example be a number or a pattern. The pattern can be rendered to be clearly visible either to the naked eye or using a microscope, or it may be hidden in the main image.

In a further authentication application, paper is roll-coated with a primer which is dried. An image is then printed using several inks at least one of them being fluorescent combination ink. The image is subsequently overprinted with a water image using, for example, an inkjet printhead, an impact printer or stamp. Alternatively, the water image is signed manually using a fountain pen type device. In another alternative, the complete image is subjected to the water by rolling or flooding to produce generalized fluorescence from the fluorescent combination ink components of the image. In yet another variation, the water is applied at a different print station, or is post-printed in a separate process.

In a further alternative printing method, paper is roll-coated with a primer, and the primer is dried. An image is then printed using several inks, at least one of them being a fluorescent combination ink, and the image is allowed to dry. In this case, no water is applied and. in the document as issued, there is no fluorescence. However, in many document tampering methods, aqueous liquids are used and so a tamperer may inadvertently stimulate the fluorescent bleed. This fluorescence can be detected if the adulterated document is presented as being authentic.

A further embodiment of the invention is particularly adapted for check printing. Methods for embedding an authentication print characteristic in checks have conventionally used offset lithography printing where there is sufficiently high resolution to print 1 point characters. For example, in one form of commercially available checks, signature lines appear when viewed by the naked eye to be slightly irregular with what appear to be small gaps and irregular edges. When magnified, it can be seen that the irregularities are in fact tiny characters. If such a check is copied by a scanner or photocopier, the individual characters are lost in the reduced resolution. Recently developed inkjet printheads have resolutions of the order of 1600 dots per inch and higher, which is sufficient for such print characteristics to be achieved using inkjet printing. With offset lithography printing, print data is static, meaning that check background images printed in a particular check run are identical. Typically, a phrase such as ORIGINALDOCUMENT is repeated without any spaces to form a line. With digital inkjet printing, variable data, unique to respective checks, is programmed into the digital control. For example, this might be repeated instances of the account holder's name, a unique code identifying the particular check, or some identifier identifying the printer used and/or the date the document was printed. Using the fluorescent combination inks, any of these authentication devices can be supplemented with a further authentication characteristic in which, for example, a unique data microprint line is given a fluorescent signature observable under black light to provide another indicator of document authenticity. Neither the unique data microprint line nor the fluorescent signature would be visible if the document were photocopied with currently achievable copy resolutions, and even future improvements in copier resolution are unlikely to reproduce the fluorescent signature.

While the water and the cationic polyDADMAC have the primary effects in terms of stimulating and regulating the bleed within the fluorescent combination inks described previously, other components in a typical primer, such as solvents and surfactants, may also have a modifying effect on the reaction dynamics and the appearance of the resulting fluorescence. Such effects are also dependent to some extent on the substrate to which the fluorescent combination ink and the primer are applied: i.e. the nature of the paper.

Although in the embodiments of the invention previously described, both components of the inks used, whether fluorescent or non-fluorescent, are dyes, it is contemplated that pigment based inks may also be used as the non-fluorescent component to be fixed to paper while an associated fluorescent component undergoes a controlled bleed as described. Pigments using non-water soluble colorants composed of extremely fine particles are widely used in the inkjet printing industry.

Essentially all forgery detection techniques can be circumvented with sufficient expenditure of time and ingenuity by a forger. Methods of the present invention can be implemented in such a way that the predetermined bleed of the fluorescent can be given a distinctive signature such as color, extent of bleed, shape of bleed, etc., or any combination of these characteristics. Such methods can also be used in combination with other techniques to thwart would-be forgers. To render fraudulent copying difficult, it is valuable to have a variety of techniques available that might be used singly or in combination to confound the determined forger.

Of the several methods described for utilizing the fluorescent bleed, in some cases a hidden image is used that becomes visible under black light while in others, a visible image is used that fluoresces under black light. In addition, either one or more minor component colors can be used to produce fluorescence including primary and spot colors. The fluorescent dyes listed previously are all water soluble and are not strongly fixed by a cationic primer. Because they show fluorescence at low loading, only a small amount of the minor fluorescent component is needed and so its presence does not affect the major component color. Of particular note, any fluorescent component can be used with a black major component in the fluorescent combination ink. Consequently, a custom black fluorescent combination ink can be used to produce a chosen fluorescence color to enable unequivocal identification of a document.

Although water soluble dyes are preferred for applications of the invention, other combinations of major component dye, minor component dye, binder (regulator), and solvent (actuator) are also contemplated for use in the invention.

Other variations and modifications will be apparent to those skilled in the art. The embodiments of the invention described and illustrated are not intended to be limiting. The principles of the invention contemplate many alternatives having advantages and properties evident in the exemplary embodiments.

What is claimed is:

1. A method for introducing a print characteristic in a visible image printed on paper, comprising printing a part of the image with an ink having first and second components, the first component being less fast than the second component in response to an applied activator, and the first component being a fluorescent component having its fluorescence substantially masked in the presence of the second component in the absence of the applied activator, and applying the activator to stimulate a bleed of the first component beyond the area of said part to create a unmasked area of the fluorescent component at the area of the bleed.

2. A method as claimed in claim 1, further comprising using a regulator to modulate the nature of the bleed.

3. A method as claimed in claim 2, the regulator being combined with the activator.

4. A method as claimed in claim 2, further comprising controlling application of the regulator and activator to define the extent of the bleed.

5. A method as claimed in claim 2, further comprising using a third component in the ink, the third component being less fast than the second component and differing in fastness from the first component in response to the applied activator, and the first and third components being fluorescent components having different color and having their fluorescence substantially masked in the presence of the second component in the absence of the applied activator, the ratio of the first and third components selected to determine a desired color characteristic of the bleed.

6. A method as claimed in claim 2, the activator being at least partly water.

7. A method as claimed in claim 2, the regulator being a cationic material.

8. A method as claimed in claim 2, the regulator being a primer applied to the paper before the ink is printed on the paper.

9. A method as claimed in claim 2, further comprising applying the activator after applying the ink.

10. A method as claimed in claim 9, the activator being applied as a predetermined pattern to render selected parts of the printed two component ink subject to the bleed.

11. A method as claimed in claim 1, further comprising applying the ink as a pattern of halftone dots.

12. A method as claimed in claim 1, the first component being one of acid red 52, sodium fluorescein, and rhodamine B.

13. A method as claimed in claim 1, the second component being one of an azo pyridine class dye, a double azo class dye, tetrasodium copper phthlalocyanine tetrasulfonate and (lithium(1+) ion pentasodium 4-[(E)-2-{4-[(E)-2-{1,8-dihydroxy-7-[(E)-2-(4-nitro-2-sulfonatophenyl)diazen-1-yl]-3, 6-disulfonatonaphthalen-2-yl}diazen-1-yl]-3-sulfonatophenyl}diazen-1-yl]-5-oxo-1-(4-sulfonatophenyl)-4,5-dihydro-1H-pyrazole-3-carboxylate).

14. A method as claimed in claim 1 wherein the printed characteristic is an authentication artefact for authenticating the paper, the method further comprising analyzing a paper subsequently purported to be the authentic paper under black light to detect whether the expected fluorescent bleed is present.

15. A method of determining whether a forged image is present on paper comprising using black light to examine the paper to determine whether a fluorescent print characteristic is present in the image, the print characteristic, if the image is not a forgery, contained in a part of the image printed with an ink having first and second components, the first component being less fast than the second component in response to an applied activator, and the first component being a fluorescent component having its fluorescence substantially masked in the presence of the second component, an activator having previously been applied to stimulate a bleed of the first component beyond the area of said part to create the print characteristic as an unmasked area of the fluorescent component in the area of the bleed, the fluorescent print characteristic, if the image is a forgery, not being present in the image.

16. A method as claimed in claim 15, the method further comprising, if a fluorescent print characteristic is determined to be present on the paper, determining at least one property of the fluorescent print characteristic and comparing the at least one property against a predetermined at least one reference property.

17. Paper bearing an authentication print characteristic in a visible image printed on the paper, a part of the image being printed with an ink having first and second components, the first component being less fast than the second component in response to an applied activator, and the first component being a fluorescent component having its fluorescence substantially masked in the presence of the second component, an activator having been applied to stimulate a predetermined bleed of the first component beyond the area of said part to create an unmasked area of the fluorescent component in the area of the bleed.

18. Paper as claimed in claim 17, the regulator being a cationic material for binding to itself anions of the two ink components.

19. Paper as claimed in claim 18, the regulator binding the first component less strongly than the second component.

20. Paper as claimed in claim 18, the cationic material being one component of a primer.

21. Paper as claimed in claim 17, the ink having a third component which is less fast than the second component and differs in fastness from the first component in response to the applied activator, the ratio of the first and third components determining a desired color characteristic of the bleed.

22. Paper as claimed in claim 17, the activator being at least partly water, the water subject to evaporation from the paper.

23. Paper as claimed in claim 20, the ink printed over the primer.

24. Paper as claimed in claim 22, the water applied over and substantially evaporated from the ink.

25. Paper as claimed in claim 24, the water applied as a predetermined pattern.

26. Paper as claimed in claim 17, the ink applied as a pattern of halftone dots.

27. Paper as claimed in claim 17, the first component being one of acid red 52, sodium fluorescein, and rhodamine B.

28. Paper as claimed in claim 17, the second component being one of an azo pyridine class dye, a double azo class dye, tetrasodium copper phthlalocyanine tetrasulfonate and (lithium(1+) ion pentasodium 4-[(E)-2-{4-[(E)-2-{1,8-dihydroxy-7-[(E)-2-(4-nitro-2-sulfonatophenyl)diazen-1-yl]-3,6-disulfonatonaphthalen-2-yl}diazen-1-yl]-3-sulfonatophenyl}diazen-1-yl]-5-oxo-1-(4-sulfonatophenyl)-4,5-dihydro-1H-pyrazole-3-carboxylate).

\* \* \* \* \*